(12) United States Patent
Mitsui et al.

(10) Patent No.: US 7,754,114 B2
(45) Date of Patent: Jul. 13, 2010

(54) METHODS FOR MANUFACTURING OPTICAL FIBER PROBE AND FOR PROCESSING MICROMATERIAL

(75) Inventors: Tadashi Mitsui, Tsukuba (JP); Hidetoshi Oikawa, Tsukuba (JP)

(73) Assignee: National Institute for Materials Science, Ibaraki (JP)

( * ) Notice: Subject to any disclaimer, the term of this patent is extended or adjusted under 35 U.S.C. 154(b) by 387 days.

(21) Appl. No.: 12/007,789

(22) Filed: Jan. 15, 2008

(65) Prior Publication Data

US 2008/0121614 A1 May 29, 2008

Related U.S. Application Data

(62) Division of application No. 10/498,881, filed as application No. PCT/JP03/07412 on Jun. 11, 2003, now Pat. No. 7,341,681.

(30) Foreign Application Priority Data

Jun. 11, 2002 (JP) .............................. 2002-170466

(51) Int. Cl.
*B29D 11/00* (2006.01)
*B29B 9/14* (2006.01)
*B29B 9/00* (2006.01)

(52) U.S. Cl. .................. 264/2.7; 264/1.1; 264/1.24; 216/24; 216/83; 216/96; 428/364; 428/375

(58) Field of Classification Search ............... 216/11, 216/24, 96, 97, 83; 264/1.1, 1.24, 2.7; 428/364, 428/375
See application file for complete search history.

(56) References Cited

U.S. PATENT DOCUMENTS

| | | | |
|---|---|---|---|
| 4,703,173 A | 10/1987 | Wood et al. | |
| 5,985,166 A * | 11/1999 | Unger et al. | 216/97 |
| 6,203,660 B1 * | 3/2001 | Unger et al. | 156/345.11 |
| 6,649,894 B2 * | 11/2003 | Matsumoto et al. | 250/201.3 |
| 6,850,852 B1 * | 2/2005 | Ferguson et al. | 702/67 |
| 7,327,665 B2 * | 2/2008 | Anatoliy et al. | 369/126 |
| 7,406,005 B2 * | 7/2008 | Hasegawa | 369/13.33 |
| 2005/0007894 A1 * | 1/2005 | Hasegawa | 369/13.33 |
| 2005/0083826 A1 * | 4/2005 | Anatoliy et al. | 369/112.27 |

FOREIGN PATENT DOCUMENTS

| | | |
|---|---|---|
| JP | 7-225975 | 8/1995 |
| JP | 11-271337 | 10/1999 |
| JP | 2000-19091 | 1/2000 |
| JP | 2000-35395 | 2/2000 |
| JP | 2000-249646 | 9/2000 |
| JP | 2002-63748 | 2/2002 |
| JP | 2003-054994 | 2/2003 |

OTHER PUBLICATIONS

Stockle et al., "High-Quality Near-Field Optical Probes by Tube Etching", *Applied Physics Letters*, vol. 75, No. 2, pp. 160-162, Jul. 1999.
Noell et al., "Micromachine Aperture Probe Tip for Multi-Functional Scanning Probe Microscopy", *Applied Physics Letters*, vol. 70, No. 10, pp. 1236-1238, Mar. 1997.
Saiki et al., "Tailoring A High-Transmission Fiber Probe for Photo scanning Tunneling Microscope," *Applied Physics Letters*, vol. 68, No. 19, pp. 2612-2614, May 1996.
Yatsui et al., Increasing Throughput of a Near-Field Optical Fiber Probe Over 1000 times by the Use of a Triple-Tapered Structure, *Applied Physics Letters*, vol. 73 No. 15, pp. 2090-2092, Oct. 1998.

* cited by examiner

*Primary Examiner*—Sanza L McClendon
(74) *Attorney, Agent, or Firm*—Wenderoth, Lind & Ponack, L.L.P.

(57) ABSTRACT

In a method for manufacturing an optical fiber probe in which an optical fiber is formed as an optical fiber probe by etching a tip section and sharpening a core region of the optical fiber, the optical fiber is a polarization maintaining optical fiber including the core region, a stress-applying region, and a clad region. The optical fiber probe is formed by mechanical-grinding of the edge of the optical fiber into a sharpened shape so that the core region is located at the tip of a sharpened portion, and by dipping the formed edge of the optical fiber in an etchant for further sharpening the core region. Accordingly, a new optical fiber probe both with high transmission efficiency and with a large polarization degree is obtained.

5 Claims, 8 Drawing Sheets

TURNING-AROUND OPERATION

PANDA TYPE

ELLIPTICAL-CORE TYPE

CORE REGION
MATERIAL: GeO$_2$-DOPED QUARTZ
SLOWLY DISSOLVED IN ETCHANT

CLAD REGION
MATERIAL: PURE QUARTZ
MAINLY DISSOLVED IN ETCHANT

ETCHANT SUCH AS HF

STRESS-APPLYING REGION
MATERIAL: B$_2$O$_3$-DOPED QUARTZ
HARDLY DISSOLVED IN ETCHANT

METHODS FOR MANUFACTURING OPTICAL FIBER PROBE AND FOR PROCESSING MICROMATERIAL

This application is a divisional of U.S. application Ser. No. 10/498,881, filed 2004 now U.S. Pat. No. 7,341,681, now allowed, which is a national stage application of International application No. PCT/JP2003/007412, filed Jun. 11, 2003.

TECHNICAL FIELD

The present invention relates to methods for manufacturing an optical fiber probe and for processing a micromaterial. More particularly, the invention according to the application relates to a method for manufacturing an optical fiber probe, in which an optical fiber, such as a polarization maintaining optical fiber, with a complex structure in the cross sectional direction is formed as an optical fiber probe. The invention also relates to a method for processing a micromaterial, in which the optical fiber probe is used.

BACKGROUND ART

An optical probing technology using near-field light has been noticed as a technology by which observation, processing or manipulation is realized in a micro-region with a size equal to or below a diffraction limit (500 nm or less, typically) (Japanese Patent Laid-Open No. HEI-10 (1998)-2905, Japanese Patent Laid-Open No. HEI-10 (1998)-132831, Japanese Patent Laid-Open No. 2000-329773, or, Japanese Patent Laid-Open No. 2001-13154). There are the following advantages in use of a sharpened optical fiber as a probe: (I) that an insulating material can be observed or processed because the fiber does not use electricity, different from the case of STM (scanning tunneling microscopy); (II) that a sample in a solution can be observed in the solution because light can propagate in water; (III) that energy states, optical properties and the like, can be simultaneously measured because spectrums and polarizations can be measured, different from the case of AFM (atomic force microscope); (IV) that the fiber can be used as manipulation such as a pair of optical tweezers by using a potential field caused by the near-field light; and (V) that the fiber can be used as lithography by using a photochemical reaction.

Recently, a trial, in which linearly polarized light is irradiated to or concentrated on the micro-region with a size equal to or below the diffraction limit by using a polarization maintaining optical fiber instead of a single-mode optical fiber which has been used so far, is beginning to be performed. However, the technology is still being developed and an optical fiber probe with a high transmission efficiency and a large polarization degree has not been realized yet for the time being.

It is well known that, as shown in FIG. 7, there are two kinds of optical fiber, that is, a PANDA type and an elliptical-core type as the polarization maintaining optical fiber. The polarization maintaining optical fiber of the PANDA type has a more complex structure, but is more easily manufactured, and has a larger polarization degree in comparison with the case of the polarization maintaining optical fiber of the elliptical-core type. Moreover, the polarization direction of the polarization maintaining optical fiber of the PANDA type can be confirmed by observing a section of the fiber with an optical microscope. On the other hand, it is difficult to confirm the polarization direction of the polarization maintaining optical fiber of the elliptical-core type. The reason is that it is impossible optically to observe a core of the fiber because the core has a similar size as that of the wavelength, or the core size is equal to or smaller than that of the wavelength, that is, is equal to or below the diffraction limit.

On the other hand, the polarization maintaining optical fiber of the elliptical-core type is preferably used when a probe is manufactured, using either of these two kinds of fibers. The reason is that two kinds of methods, a melting and pulling method and an etching method, may be used as a method for manufacturing the probe in the case of the polarization maintaining optical fiber of the elliptical-core type. Only the melting and pulling method can be applied for manufacturing the polarization maintaining optical fiber of the PANDA type. Here, "the melting and pulling method" is a method in which an optical fiber (82) is physically sharpened by heating and melting with heating means (81) such as a hydrogen flame, laser beams, and arc discharge, and by pulling the optical fiber (82), as shown in FIG. 8. "The etching method" is a method in which a clad region (92) and a core region (93) of the optical fiber are dissolved by using an etchant (91) such as hydrofluoric acid for etching, as shown in FIG. 9, and the core region (93) is chemically sharpened. A physical method such as the melting and pulling method has an advantage in simple processing, but a probe with a high transmission efficiency can be obtained by applying a chemical method such as the etching method.

In the polarization maintaining optical fiber of the PANDA type, it is impossible to form a probe because a stress-applying region remains undissolved when the fiber is chemically sharpened as shown in FIG. 10. The reason is that a material with high chemical resistance such as beryllium is doped in the stress-applying region.

As described above, the polarization maintaining optical fiber of the PANDA type has advantages that the fiber is easily manufactured, it has a large polarization degree, and the polarization direction can be confirmed by observing the section of the fiber with an optical microscope. On the other hand, since a chemical method cannot be applied for the polarization maintaining optical fiber of the PANDA type, it has been considered that it is difficult to manufacture a probe with a high transmission efficiency, using the fiber of this type. Then, development of a new method for forming a probe in an easy manner has been required.

Accordingly, the invention according to the application has been made, considering the above-described circumstances, to provide a new method for manufacturing an optical fiber probe with a high transmission efficiency and with a large polarization degree, and a new method for processing a micromaterial using the optical fiber probe.

SUMMARY OF THE INVENTION

The present invention has been made for solving the above-described problems. According to a first aspect of the invention, there is provided a method for manufacturing an optical fiber probe in which an optical fiber is formed as the optical fiber probe by etching a tip section and sharpening a core region of the optical fiber. The optical fiber is a polarization maintaining optical fiber comprising the core region, a stress-applying region, and a clad region. The optical fiber probe is formed by mechanical-grinding of the edge at an end of the optical fiber into a sharpened shape so that the core region is located at the tip of a sharpened portion, and by dipping the formed edge of the optical fiber in an etchant for further sharpening the core region.

According to a second aspect of the invention, there is provided a method for manufacturing an optical fiber probe in which an optical fiber is formed as the optical fiber probe by etching a tip section and sharpening a core region of the optical fiber. The optical fiber is a polarization maintaining optical fiber comprising the core region, a stress-applying region, and a clad region. The optical fiber probe is formed by forming a notch in the sectional direction on the periphery of the core region at the edge of the optical fiber; by dipping the optical fiber in an etchant in a vertical manner to the portion with the notch; and by dissolving the core region for sharpening while pulling the core region by its own weight of the optical fiber in the direction of the tip from the notch.

Further, according to a third aspect of the invention, there is provided a method for processing a micromaterial wherein a micromaterial which comprises a plurality of anisotropic molecules having interactions with polarized light is absorbed, moved, assembled, and processed, using as a probe for a pair of optical tweezers an optical fiber probe manufactured by the above-described method for manufacturing the optical fiber probe.

According to a fourth aspect of the invention, there is provided a method for processing a micromaterial, wherein the micromaterial is assembled and processed under controlling the orientation of anisotropic molecules by switching a polarization direction of incident light into the optical fiber probe.

Moreover, according to a fifth aspect of the invention, there is provided a method for processing a micromaterial wherein, using an optical fiber probe manufactured by the above method for manufacturing the optical fiber probe as a probe for a pair of optical tweezers, a polymerization bond can be formed among anisotropic molecules by controlling the orientation of an anisotropic molecule group located on a substrate, and by allowing polarized light with a wavelength of high chemical activation for the anisotropic molecule group to enter into the optical fiber probe for irradiation on the anisotropic molecule group.

The above-described method for processing a micromaterial is characterized in that the anisotropic molecule is any one of an inorganic molecule, an organic molecule, a magnetic molecule, a liquid crystal molecule, and a polymerizable molecule.

Figure 1:
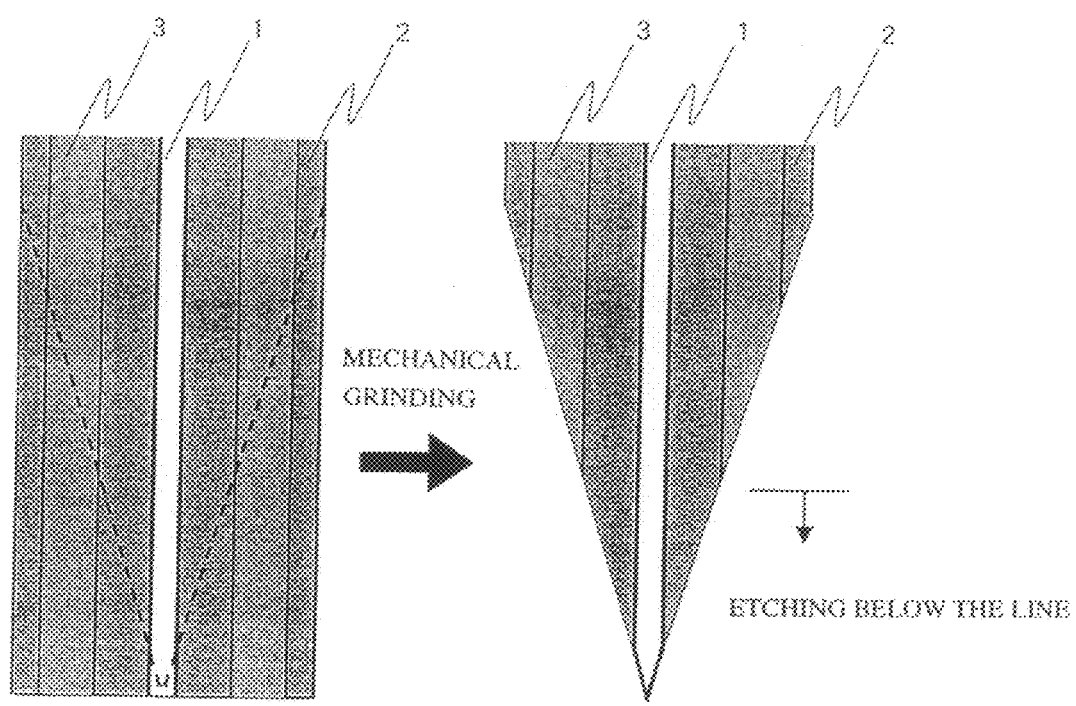
FIG. 1 is a schematic view showing a procedure of a method for manufacturing an optical fiber probe according to the invention of the application.

1 core region
2 stress-applying region
3 clad region
21 grinding wax for electronics industry use grade
22 optical fiber
23 grinding surface plate
31 core region
32 notch
33 etchant
34 optical fiber in the direction of the tip
35 stress-applying region
41 anisotropic molecules
42 optical fiber probe
43 polarization direction of incident light
51 optical fiber probe
52 polarization direction
53 substrate
54 anisotropic molecule group
81 heating means
82 optical fiber
91 etchant
92 clad region
93 core region

DETAILED DESCRIPTION OF THE INVENTION

The invention according to the application has the above-described features, and embodiments will hereinafter be explained.

According to a method for manufacturing an optical fiber probe according to the invention of the application, a polarization maintaining optical fiber of a PANDA type and an optical fiber with a complex structure in the cross sectional direction, as the object to be treated, are etched and a core region at a tip section of the optical fiber is sharpened to form the optical fiber probe.

Figure 2:
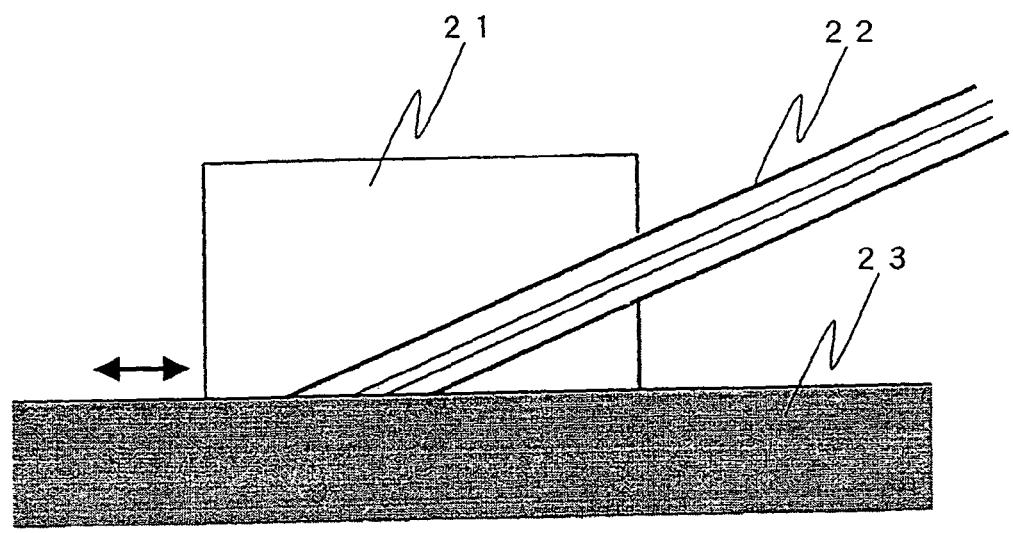
FIG. 2 is a schematic view showing a process for manufacturing an optical fiber probe according to the method for manufacturing an optical fiber probe based on the invention of the application.
Figure 2:
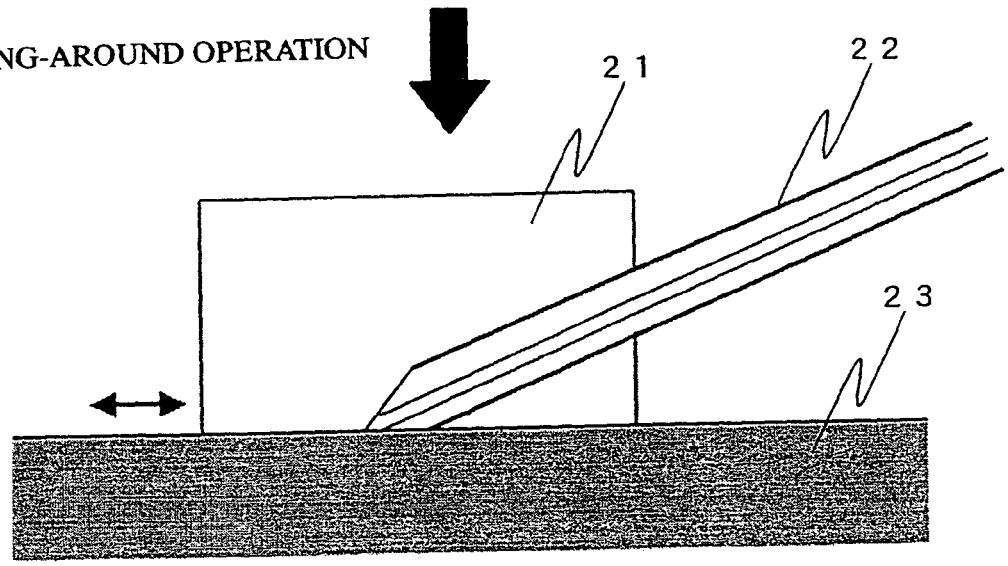

FIG. 1 shows an outline of the method for manufacturing an optical fiber probe according to the invention of the application. Moreover, FIG. 2 shows a process for manufacturing the optical fiber probe according to the method for manufacturing an optical fiber probe based on the invention of the application. In the first place, an edge of the optical fiber is mechanically ground into a sharpened shape (i.e., to form a sharpened linear edge) so that a core region (1) may be located at the tip of a sharpened portion. At this time, a stress-applying region (2) is ground backward from the core region (1). Then, a clad region (3) is completely dissolved by dipping the sharpened edge of the optical fiber (1) (the portion indicated by an arrow in the right-side drawing of FIG. 1) with a sharpened shape in an etchant. Subsequently, the core region (1) is further sharpened to be formed as the optical fiber probe.

The mechanical grinding of the edge of the optical fiber is performed according to a mechanical grinding method for electronics industry use grade. Specifically, an optical fiber (22) is fixed at an angle with respect to a grinding surface plate

(23) for grinding with wax (21) for electronics grade and the like along with a turning-around (flipping over) operation as shown in FIG. 2. A setting angle of the optical fiber (22) (angle between the optical fiber (22) and the grinding surface plate (23)) at mechanical grinding is suitably set, depending on the configuration of the optical fiber. The setting angle is preferably set to be from one degree through eight degrees in the case of a polarization maintaining optical fiber of a PANDA type with dimensions, for example, in which the diameter of the core region is 4 μm; the diameter of the clad region is 125 μm; the diameter of the stress-applying region is 40 μm; and the length from the center to the edge of the stress-applying region is 6 μm.

Figure 3:
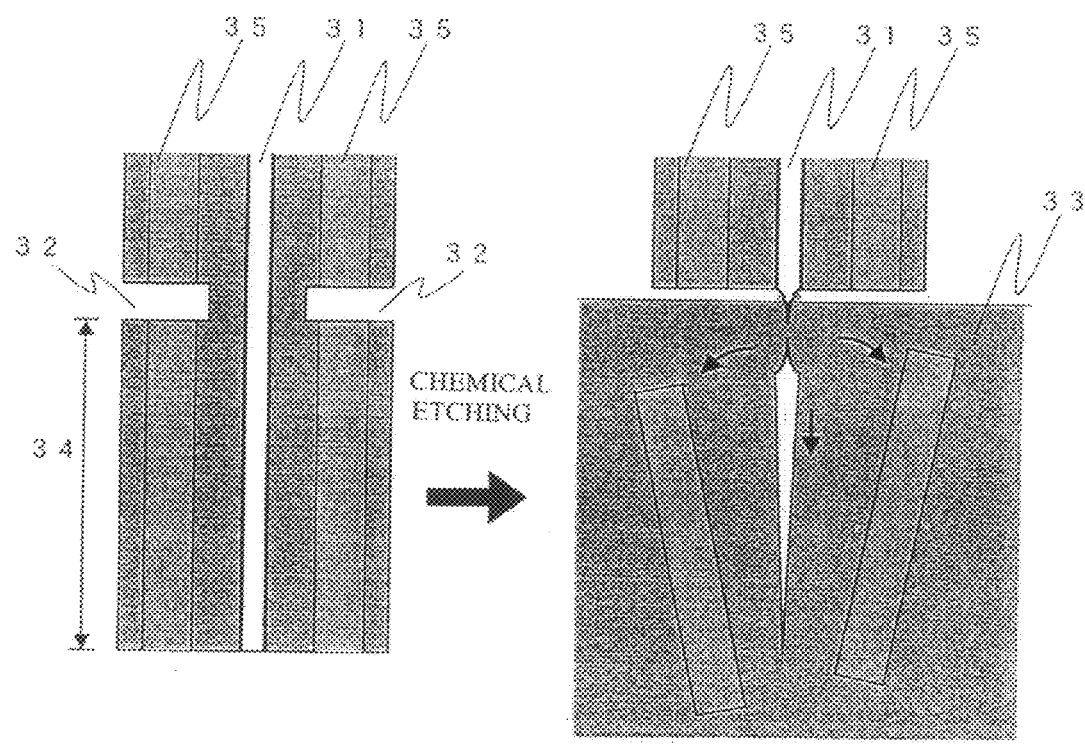
FIG. 3 is another schematic view showing a procedure of a method for manufacturing an optical fiber probe according to the invention of the application.

Moreover, in the method for manufacturing an optical fiber probe according to the invention of the application, the optical fiber probe may be formed by sharpening a core region (31) through the following steps as shown in FIG. 3: in the first place, a notch (32) is formed in the sectional direction on the periphery of the core region (31) at the edge of an optical fiber by a focused ion beam processing method and the like; in the second place, the optical fiber is vertically dipped in an etchant (33) to the portion with the notch (32); and finally, the core region (31) is dissolved for sharpening while pulling the section (31) by its own weight of an optical fiber (34) in the direction of the tip from the notch (32). At this time, the length of optical fiber (34) in the direction of the tip from the notch (32) is preferably about 3 cm, considering that the weight is required to pull the core region (31). The depth of the notch (32) may be suitably selected, depending on the configuration of the optical fiber and the shape of the optical fiber probe to be formed. The notch (32) is formed so that a stress-applying region (35), which is not dissolved in the etchant, is cut.

An optical fiber probe manufactured by the above-explained method for manufacturing an optical fiber probe according to the invention of the application can be used for various kinds of applications. Hereinafter, advantages of an optical fiber probe manufactured by the method for manufacturing the optical fiber probe according to the invention of the application will be explained.

1) Molecular Manipulation by Directional Control

An anisotropic molecule such as a liquid crystal molecule can be transferred and assembled through directional control by using, as a probe for a pair of optical tweezers, an optical fiber probe manufactured by the method for manufacturing an optical fiber probe according to the invention of the application. Accordingly, it is expected that new applications in a nanofabrication field are developed.

Figure 4:
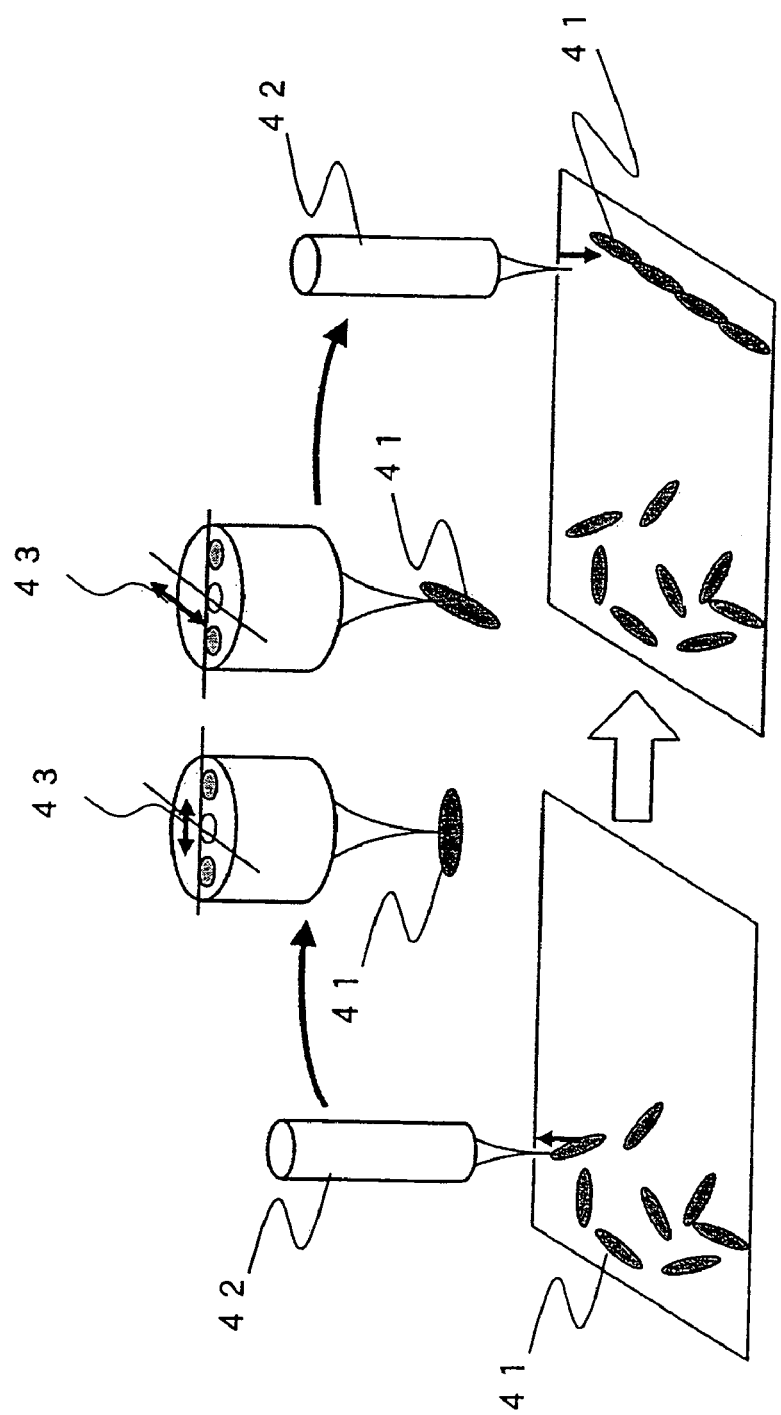
FIG. 4 is a schematic view showing an application method of an optical fiber probe manufactured according to the method for manufacturing the optical fiber probe based on the invention of the application.

As shown in FIG. 4, absorbing, moving, assembling and processing of a micromaterial, which comprises a plurality of anisotropic molecules (41) having interactions with polarized light, can be executed, using the optical fiber probe (42) manufactured by the method for manufacturing an optical fiber probe according to the invention of the application, by switching of a polarization direction (43) of incident light to the optical fiber probe (42) and controlling the orientation of the anisotropic molecules (41). Assembling under controlling the orientation of an anisotropic molecular group cannot be achieved by a conventional STM and AFM, and is realized for the first time by the invention according to the application.

A micromaterial for assembling comprises an anisotropic molecule such as an inorganic molecule, an organic molecule, a magnetic molecule, a liquid crystal molecule, or, a polymerizable molecule.

2) Polymerization Reaction Accompanied by Orientation Control

Using, as a probe for a pair of optical tweezers, an optical fiber probe (51) manufactured by the method for manufacturing an optical fiber probe according to the invention of the application, a polymerization bond can be formed among anisotropic molecules while controlling the orientation of an anisotropic molecule group (54) located on a substrate (53) by allowing polarized light, such as ultraviolet light, with a wavelength of high chemical activation for the anisotropic molecule group to enter into the optical fiber probe (51) while controlling the polarization direction (52) of the polarized light.

Figure 5:
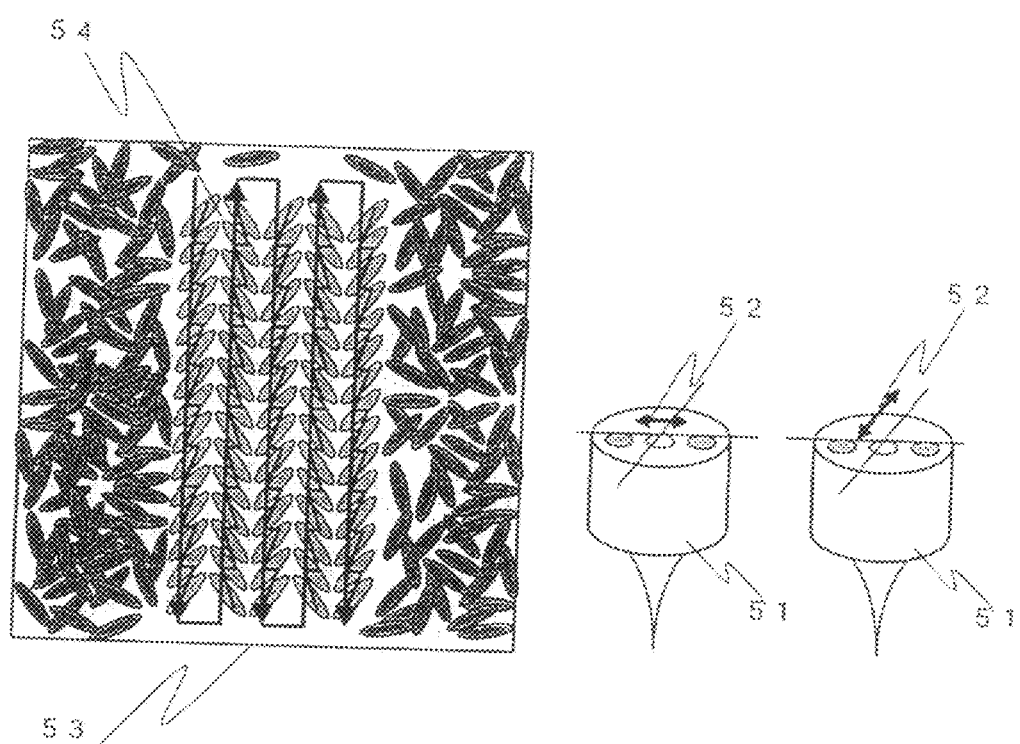
FIG. 5 is another schematic view showing an application method of an optical fiber probe manufactured according to the method for manufacturing the optical fiber probe based on the invention of the application.

As the anisotropic molecule located on the substrate, an inorganic molecule, an organic molecule, a magnetic molecule, a liquid crystal molecule, a polymerizable molecule, and the like are listed. An electronic circuit, an alternately-oriented microstructure as shown in FIG. 5, and the like can be manufactured by the above-described method.

3) Probe for Linearly-Polarized-Light Near-Field Microscope

A physical-property evaluation method using light, instead of an electron beam, as an excitation source has the following advantages:

the method is applicable to an insulating material because of no charging;

the method causes no damage even to an organic substance;

the method requires no vacuum; and the method is applicable to a living being and a biomaterial because the light propagates in water. The optical fiber probe manufactured by the method for manufacturing an optical fiber probe according to the invention of the application is expected to improve the performance of the microscope remarkably by application to a near-field optical microscope because the probe can control polarization.

4) Microprocessing Such as Lithography Using a Probe

Though it has been known that processing quality is improved by using polarized light in microprocessing by the lithography, it has been considered that it is difficult to realize manufacturing of a circuit pattern with a line width of equal to or smaller than 100 nm. There is quite a possibility that the optical fiber probe manufactured by the method for manufacturing an optical fiber probe according to the invention of the application will become an element technology for realizing manufacturing of the above-mentioned circuit pattern.

The above description is one example of aspects of the method for manufacturing an optical fiber probe according to the invention of the application. Obviously, the invention according to the application is not limited to the above-described embodiments, and it should be considered that various variations and modifications may be possible.

The invention according to the application has the above-described advantages. Hereinafter, the explanation will be more specifically made, referring to examples.

EXAMPLES

Example 1

An optical fiber probe was manufactured by etching an exposed core region after a polarization maintaining optical fiber of a PANDA type was ground at an angle by a mechanical grinding method for electronics industry use grade.

Figure 6:
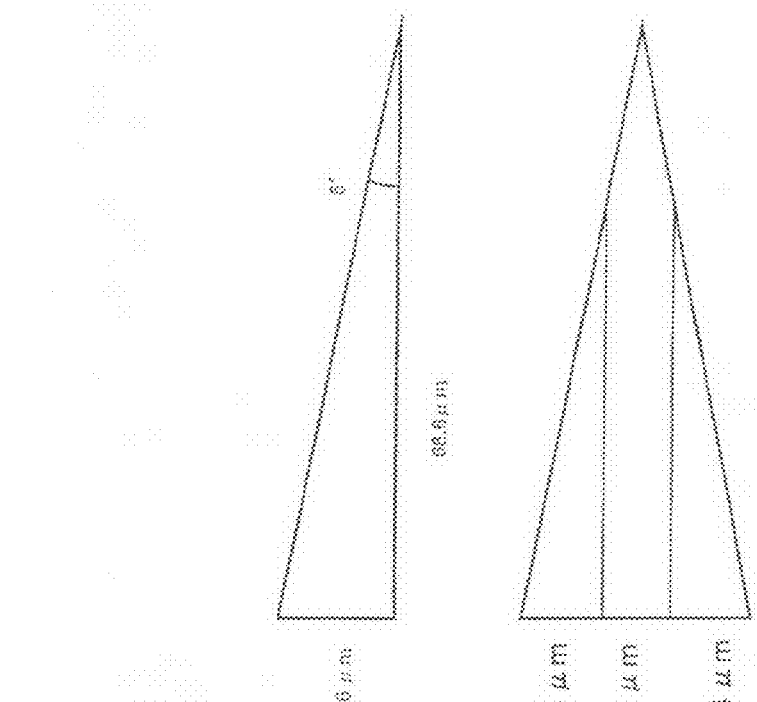
FIG. 6 is a schematic view showing a structure of a polarization maintaining optical fiber used as a material in examples according to the invention of the application and a structure of a manufactured polarization maintaining optical fiber probe.
Figure 6:
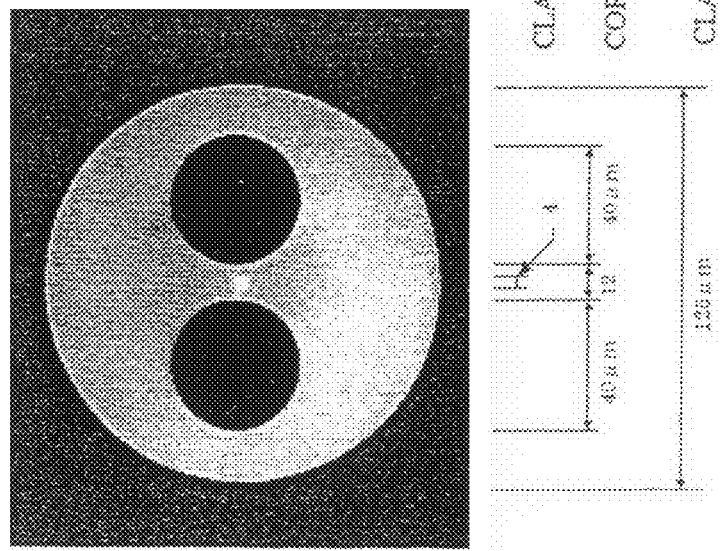
Figure 7:
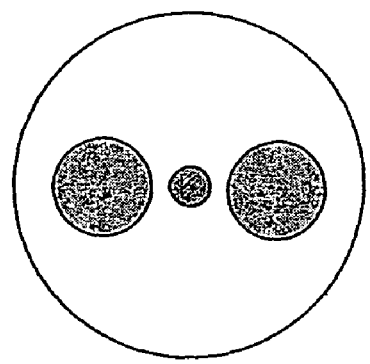
FIG. 7 is a schematic view showing the kinds of the polarization maintaining optical fiber.
Figure 7:
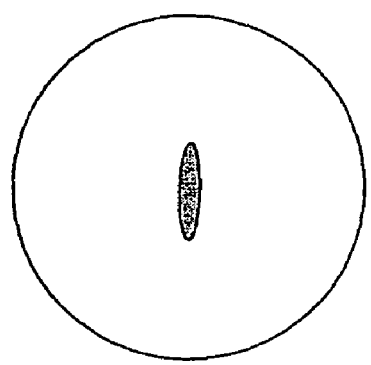
Figure 8:
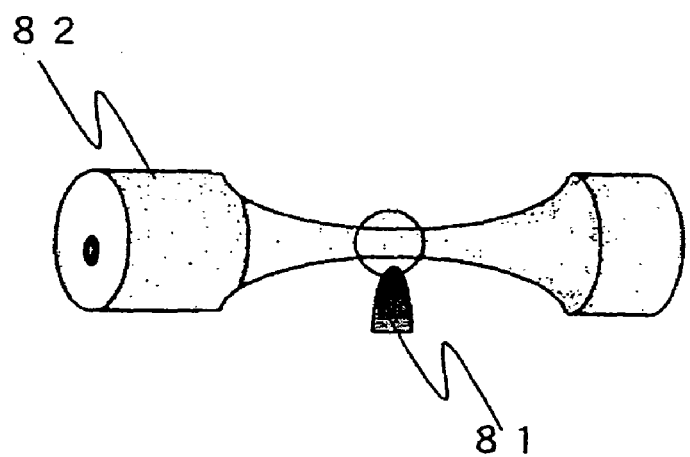
FIG. 8 is a schematic view showing a conventional method for forming a polarization maintaining optical fiber probe.
Figure 9:
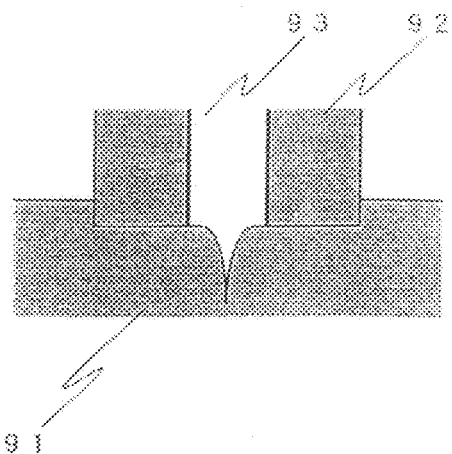
FIG. 9 is another schematic view showing a conventional method for forming a polarization maintaining optical fiber probe.
Figure 10:
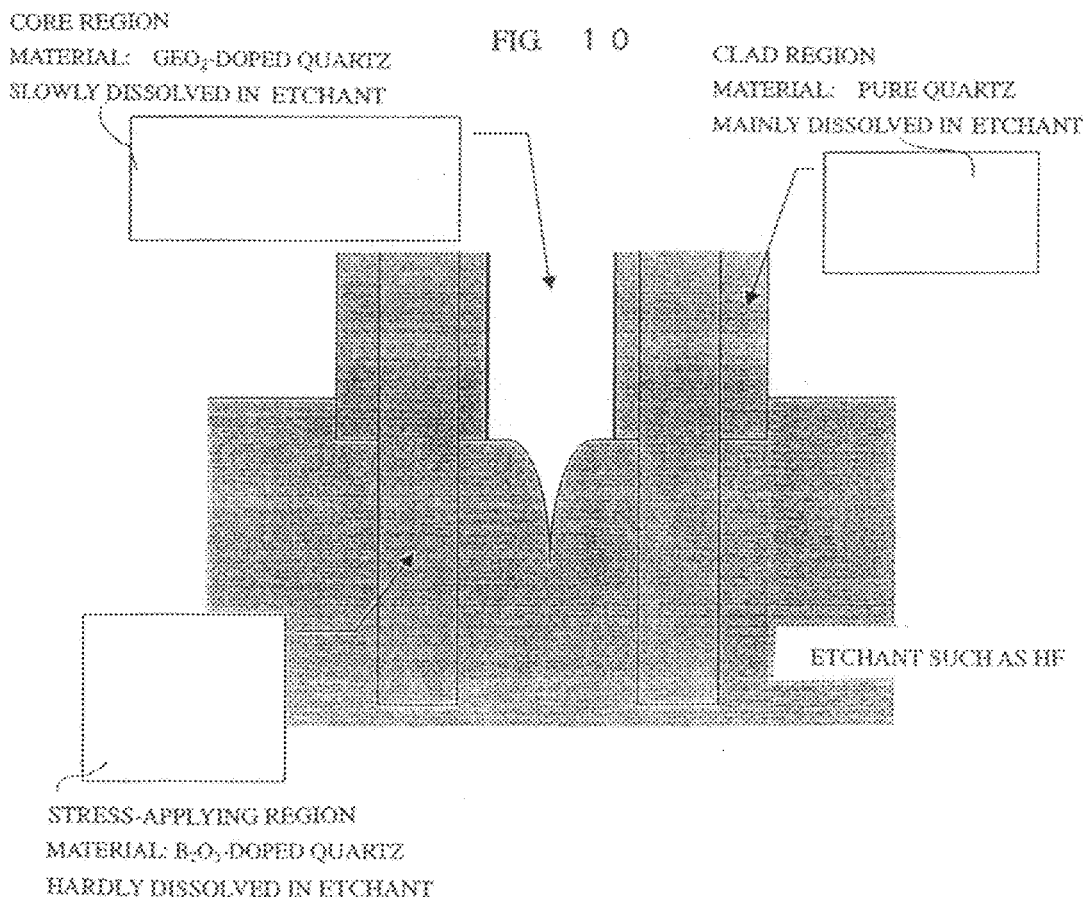
FIG. 10 is further another schematic view showing a conventional method for forming a polarization maintaining optical fiber probe.

As shown in FIG. 6, a polarization maintaining optical fiber with dimensions, in which the diameter of the core region was 4 μm, the diameter of clad region was 125 μm, and the diameter of a stress-applying region was 40 µm, was used. The length between the center of the polarization maintaining optical fiber and the edge of the stress-applying region was 6 µm, and the operating wavelength was 0.62 µm. The material of the core region was $GeO_2$-doped quartz, that of the clad region was pure quartz, and that of the stress-applying region was $B_2O_3$-doped quartz. The crosstalk of the used polarization maintaining optical fiber was equal to or smaller than −30 dB after transmission.

The tip of the polarization maintaining optical fiber was fixed with wax for electronics industry use grade, and was ground at an angle of five degrees. Diamond particles with particle diameters of 0.3 µm and 0.05 µm were used as a grinding material for mirror grinding. Thereby, a tip section with a length of about 68.6 µm, in which there was no stress-applying region, could be exposed.

The exposed tip section was etched, using a hydrofluoric acid solution with a composition of $NH_4F:HF:H_2O=X:1:1$. At this time, two-step chemical etching was executed, in which the composition ratios of the hydrofluoric acid solution was adjusted so that X=1.8 for the first step and X=10 for the second step were obtained. Two-step tapered probe was made by two-step chemical etching, and the probe was coated with gold as a metal film, using sputtering. The thickness of the metal film was 140 nm. A micro-opening with an opening diameter of 100 nm was formed at the tip by contact of the made optical fiber probe with a sample and the like.

It was confirmed by measurement that the polarization degree of the polarization maintaining optical fiber probe was improved to a crosstalk ratio of 100:1 in comparison with that of 4:1, which had been realized by a conventional polarization maintaining optical fiber probe of an elliptical-core type. When the optical fiber probe was used for a near-field optical microscope, it was also confirmed that the performance for measuring a distribution of polarized light was remarkably improved.

Example 2

In a state, in which a notch was formed around the core region at the tip section of the optical fiber used in the EXAMPLE 1 by a focused ion beam processing method and the stress-applying region was cut, etching was executed. At this time, the notch was formed at a position about 3 cm away from the point of the optical fiber. While etching, a portion between the end point and a point 3 cm from the end point (forward portion from the notch) was vertically dipped in an etchant. Since the liquid level of the etchant is higher than the notch portion by the capillary phenomenon even though the level is not exactly set to that of the notch, the liquid level of the etchant is required to be maintained at a level immediately before the level creeps up to the notch. With regard to the etching, the two-step chemical etching was executed in a similar manner to that of the EXAMPLE 1.

In this example, an optical fiber probe is manufactured in an easier manner than that of the EXAMPLE 1, and has high quality because a portion to become an optical fiber probe is kept in a vertical state by the weight of the optical fiber which is dipped in the etchant.

It was found by measurement that the crosstalk ratio of the polarization maintaining optical fiber probe was 200:1 and the yield ratio of the polarization maintaining optical fiber was 19% in this example, in comparison with that of 1% for the EXAMPLE 1. Accordingly, it was confirmed that the method for manufacturing an optical fiber probe according to the example was an extremely excellent one.

Example 3

Microprocessing by local polymerization of a diacetylene thin film was executed, using the polarization maintaining optical fiber probe manufactured in EXAMPLE 2. The opening diameter of the used optical fiber probe was 50 nm.

A thin film of diacetylene was deposited on a silicon substrate by a spin coating method. The sample was scanned while ultraviolet light was irradiated on the sample by the polarization maintaining optical fiber probe to form polymerization reaction between molecules. The wavelength of the ultraviolet light for irradiation was 325 nm and a He—Cd laser was used as a light source.

The polarization direction was set at an angle of 45 degrees with regard to the scanning direction for outward scanning to execute one-line scanning, and homeward scanning was executed after the polarization direction was rotated by 90 degrees. As a result, a microstructure in which the orientations varied at intervals of 50 nm could be manufactured. Obviously, the above can not be realized by a method using a conventional STM.

Furthermore, one row of the formed microstructure is one macromolecule and all macromolecules have the same length. In a usual chemical process, it is impossible to polymerize macromolecules which have similar molecular weights as described above.

INDUSTRIAL APPLICABILITY

As explained above in detail, the invention according to the application provides a new optical fiber probe both with a high transmission efficiency and with a large polarization degree.

According to the invention of the application, cheap and simple manufacturing of a high-quality polarization maintaining optical fiber probe, using a polarization maintaining optical fiber of a PANDA type, is realized, though it has been impossible to realize the manufacturing by conventional technologies. Accordingly, practical use of the invention is strongly expected because there is quite a possibility that the invention has various kinds of applications in a technical field of nanotechnology.

The invention claimed is:

1. A method of manufacturing an optical fiber probe, comprising:
    forming a notch in a polarization-maintaining optical fiber including a core region, a stress-applying region, and a clad region, said forming comprising forming the notch in the sectional direction on the periphery of the core region at the edge of the optical fiber so as to form a sharpened linear edge in a portion of the core region at a tip of the optical fiber;
    dipping the optical fiber into an etchant in a vertical manner to the portion with the notch; and
    dissolving the core region for sharpening while pulling the core region by its own weight of the optical fiber in the direction of the tip from the notch.

2. A method of processing a micromaterial, comprising:
    absorbing, moving, assembling, and processing a micromaterial including a plurality of anisotropic molecules having interactions with polarized light, said absorbing, moving, assembling, and processing being performed using as an optical fiber probe manufactured according to claim 1.

3. The method of claim 2, wherein said assembling and processing of the micromaterial is performed by controlling an orientation of anisotropic molecules by switching a polarization direction of incident light into the optical fiber probe.

4. A method of manufacturing a micromaterial, comprising:
   forming a polymerization bond among anisotropic molecules by controlling an orientation of an anisotropic molecule group located on a substrate using the optical fiber probe manufactured according to claim 1; and
   allowing polarized light with a wavelength of high chemical activation for the anisotropic molecule group to enter into the optical fiber probe for irradiation on the anisotropic molecule group.

5. The method of claim 4, wherein the anisotropic molecule group is any one of an inorganic molecule group, an organic molecule group, a magnetic molecule group, a liquid crystal molecule group, and a polymerizable molecule group.

* * * * *